(12) United States Patent
Oh

(10) Patent No.: US 9,378,300 B2
(45) Date of Patent: Jun. 28, 2016

(54) INTERFACE METHOD AND DISPLAY DEVICE

(75) Inventor: Chang-seok Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 250 days.

(21) Appl. No.: 12/905,563

(22) Filed: Oct. 15, 2010

(65) Prior Publication Data

US 2011/0093606 A1    Apr. 21, 2011

(30) Foreign Application Priority Data

Oct. 16, 2009    (KR) .......................... 10-2009-0098879

(51) Int. Cl.
G06F 17/30 (2006.01)

(52) U.S. Cl.
CPC .... G06F 17/30905 (2013.01); G06F 17/30861 (2013.01); G06F 17/30902 (2013.01)

(58) Field of Classification Search
USPC ........... 703/231, 228, 200; 709/231, 228, 200
See application file for complete search history.

(56) References Cited

U.S. PATENT DOCUMENTS

| | | | |
|---|---|---|---|
| 6,452,609 B1 | 9/2002 | Katinsky et al. | |
| 6,813,768 B1 * | 11/2004 | Cragun | 718/107 |
| 7,437,678 B2 * | 10/2008 | Awada et al. | 715/784 |
| 2002/0052929 A1 * | 5/2002 | Walker et al. | 709/218 |
| 2002/0133247 A1 | 9/2002 | Smith et al. | |
| 2002/0161909 A1 * | 10/2002 | White | 709/231 |
| 2004/0049541 A1 * | 3/2004 | Swahn | 709/203 |
| 2004/0111526 A1 * | 6/2004 | Baldwin et al. | 709/231 |
| 2004/0267899 A1 | 12/2004 | Rahman et al. | |
| 2005/0165942 A1 * | 7/2005 | McDowall et al. | 709/231 |
| 2007/0143493 A1 * | 6/2007 | Mullig et al. | 709/232 |
| 2007/0220414 A1 * | 9/2007 | Dunn et al. | 715/501.1 |
| 2008/0015718 A1 * | 1/2008 | Yoneda et al. | 700/94 |
| 2008/0162573 A1 * | 7/2008 | Eyal | 707/104.1 |
| 2009/0282099 A1 * | 11/2009 | Romm | 709/203 |
| 2011/0191687 A1 * | 8/2011 | Takeda | G06F 15/177 715/736 |

FOREIGN PATENT DOCUMENTS

| | | |
|---|---|---|
| CN | 1484796 | 3/2004 |
| KR | 10-0782875 | 12/2007 |
| KR | 100854252 | 8/2008 |

OTHER PUBLICATIONS

Korean Office Action dated Jun. 2, 2015 issued in couterpart application No. 10-2009-0098879, 7 pages.

* cited by examiner

*Primary Examiner* — Yemane Mesfin
*Assistant Examiner* — Peter Chen
(74) *Attorney, Agent, or Firm* — The Farrell Law Firm, P.C.

(57) ABSTRACT

A method and apparatus for outputting data is provided. The method includes outputting a first web page containing streaming data, before the streaming data is completely reproduced, when a request to output a second web page is received, outputting the second web page while continuously receiving the streaming data, and when data of an amount that is appropriate to continuously reproduce the streaming data without data delay is received, announcing that the streaming data is capable of being reproduced.

13 Claims, 6 Drawing Sheets

INTERFACE METHOD AND DISPLAY DEVICE

PRIORITY

This application claims priority to Korean Patent Application No. 10-2009-0098879, filed on Oct. 16, 2009, in the Korean Intellectual Property Office, the entire disclosure of which is incorporated herein by reference.

BACKGROUND OF THE INVENTION

1. Field of the Invention

The present invention generally relates to display devices and interface methods, and, more particularly, to a display device including a display unit, and an interface method used in the display device.

2. Description of the Related Art

Various types of mobile devices are being rapidly supplied with the development of information and communication technologies. Portability and communicability are important factors in the selection of a mobile device.

Specifically, mobile devices are increasingly used for web surfing while a user moves.

SUMMARY OF THE INVENTION

Aspects of the present invention provide methods and devices for outputting data.

According to an aspect of the present invention, there is provided a method of outputting data, the method including outputting a first web page containing streaming data; before the streaming data (e.g., a moving image) is completely reproduced, when a request to output a second web page is received, outputting the second web page while continuously receiving the streaming data; and when data of an amount that is appropriate to continuously reproduce the streaming data without data delay is received, announcing that the streaming data is capable of being reproduced.

The method further includes, when a request for reproduction of the streaming data is received in response to the announcing, outputting the first web page to a window in which the second web page is output.

The method further includes, when a request for reproduction of the streaming data is received in response to the announcing, outputting the streaming data to a separate window.

The method further includes, when a signal for refusing reproduction of the streaming data is received in response to the announcing, deleting the streaming data from a buffer.

According to another aspect of the present invention, there is provided a data output device including an output unit for outputting a first web page containing streaming data; a receiving unit for receiving data related to the first web page; a controlling unit, before the streaming data is completely reproduced, when a request to output a second web page is received, for controlling the data output device to output the second web page, while continuously receiving the streaming data; and an announcing unit, when data of an amount that is appropriate to continuously reproduce the streaming data without data delay is received, for announcing that the streaming data is capable of being reproduced.

BRIEF DESCRIPTION OF THE DRAWINGS

The above and other features and advantages of the present invention will become more apparent by describing embodiments thereof in detail, with reference to the attached drawings in which.

DETAILED DESCRIPTION OF THE EMBODIMENTS OF THE PRESENT INVENTION

The present invention will now be described more fully with reference to the accompanying drawings, in which embodiments of the invention are shown.

Figure 1:
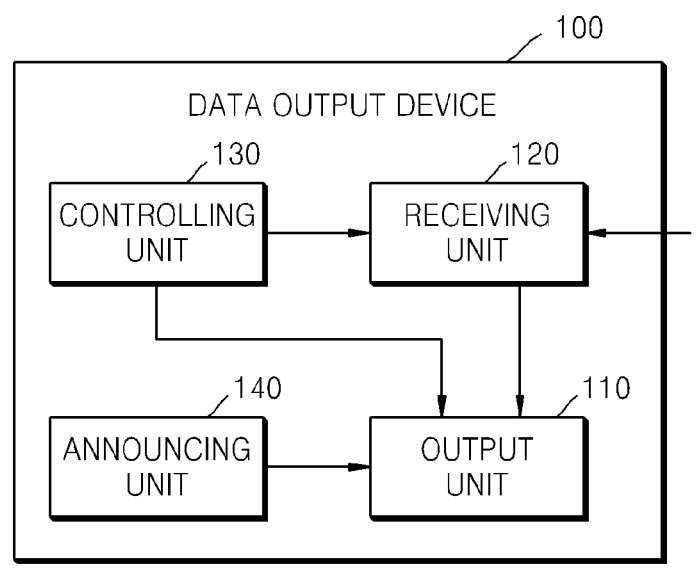
FIG. 1 is a block diagram of a data output device according to an embodiment of the present invention.

FIG. 1 is a block diagram of a data output device 100, according to an embodiment of the present invention.

The data output device 100 includes an output unit 110, a receiving unit 120, a controlling unit 130, and an announcing unit 140.

The output unit 110 outputs data related to a web page. The output unit 110 may output the data related to the web page to a displaying unit (not shown) and a speaker (not shown).

The receiving unit 120 receives the data related to the web page. For example, the receiving unit 120 may receive at least one piece of data selected from a hypertext markup language (HTML) document, an extensible markup language (XML) document, and multimedia data to be output through the web page. The receiving unit 120 may receive data by using at least one of a download method, and a streaming method.

In the download method, media data is received completely, and then the media data is output. In this case, the media data may be provided in a stable and continuous manner without data delay. However, the media data may not be provided until the media data is completely downloaded, and space for storing the downloaded media data is required. On the other hand, in the streaming method, a portion of media data is buffered and output upon being received. In this case, the media data may be provided to the user whenever a user wants the media data. However, when the amount of received data is smaller than the amount of output data due to external factors such as the network environment, the media data may not be continuously provided. That is, the media data may not be continuously reproduced due to data delay.

Throughout this specification, data received by using the download method will be referred to as download data, and data received by using the streaming method will be referred to as streaming data.

Before streaming data, which is contained in a web page that is being output, is completely output, when a user requests output of another web page, the controlling unit 130 controls the output unit 110 to output the web page, which is requested by the user, while the streaming data is continuously received. When an appropriate amount of data to continuously reproduce the streaming data without data delay is received, the announcing unit 140 announces that the streaming data is capable of being reproduced.

An operation of the data output device 100 will now be described in a time sequence.

First, a user requests output of a first web page. It is assumed that the streaming data is contained in the first web page.

The output unit 110 outputs the first web page. Data required to output the first web page may be stored in the data output device 100, or alternatively, the data required to output the first web page may be received by the receiving unit 120. In this case, the output unit 110 sequentially outputs the received streaming data, without standing-by until the streaming data is completely received. If a communication environment is satisfactory, the streaming data may be continuously reproduced without data delay. However, if the communication environment is not satisfactory, the streaming data may not be continuously reproduced due to data delay.

When the streaming data is not continuously reproduced due to data delay, the user may be likely to request switching from the first web page to another web page. In FIG. 1, it is assumed that the user requests output of a second web page before the streaming data is completely reproduced. In addition, it is assumed that the user requests that the streaming data be continuously received while the second web page is output.

The controlling unit 130 controls the receiving unit 120 to continuously receive the streaming data, and controls the output unit 110 to output the second web page. Thus, the second web page is displayed on the displaying unit (not shown), but the streaming data is continuously received in the background.

When an appropriate amount of data to continuously reproduce the streaming data without data delay is received by the receiving unit 120, the announcing unit 140 announces to the user that the streaming data is capable of being reproduced. The amount of data that is appropriate to continuously reproduce the streaming data without data delay may vary depending on a user's settings or communication environments.

If the streaming data is not received for a predetermined period of time, the announcing unit 140 announces to the user that the streaming data is not capable of being received, and deletes all data that is related to the streaming data that was stored in a buffer.

The announcing unit 140 may announce information to the user using various methods. For example, the announcing unit 140 may display a window for announcing that the streaming data is capable of being reproduced, or it may output a sound for announcing that the streaming data is capable of being reproduced.

When the user requests reproduction of the streaming data, in response to the announcement of the announcing unit 140, the controlling unit 130 may control the output unit 110 so that the first web page may be output to a new window, or the first web page may be output to the window in which the second web page is being reproduced.

Additionally, the controlling unit 130 may control the output unit 110 to output only the streaming data to a separate window. In this case, the controlling unit 130 may control the output unit 110 to output the streaming data in a widget form.

If the user refuses the reproduction of the streaming data, in response to the announcement of the announcing unit 140, the controlling unit 130 deletes the stored streaming data from a buffer.

An operation of a data output device according to an embodiment of the present invention will now be described in detail, with reference to FIGS. 2 through 4.

Figure 2:
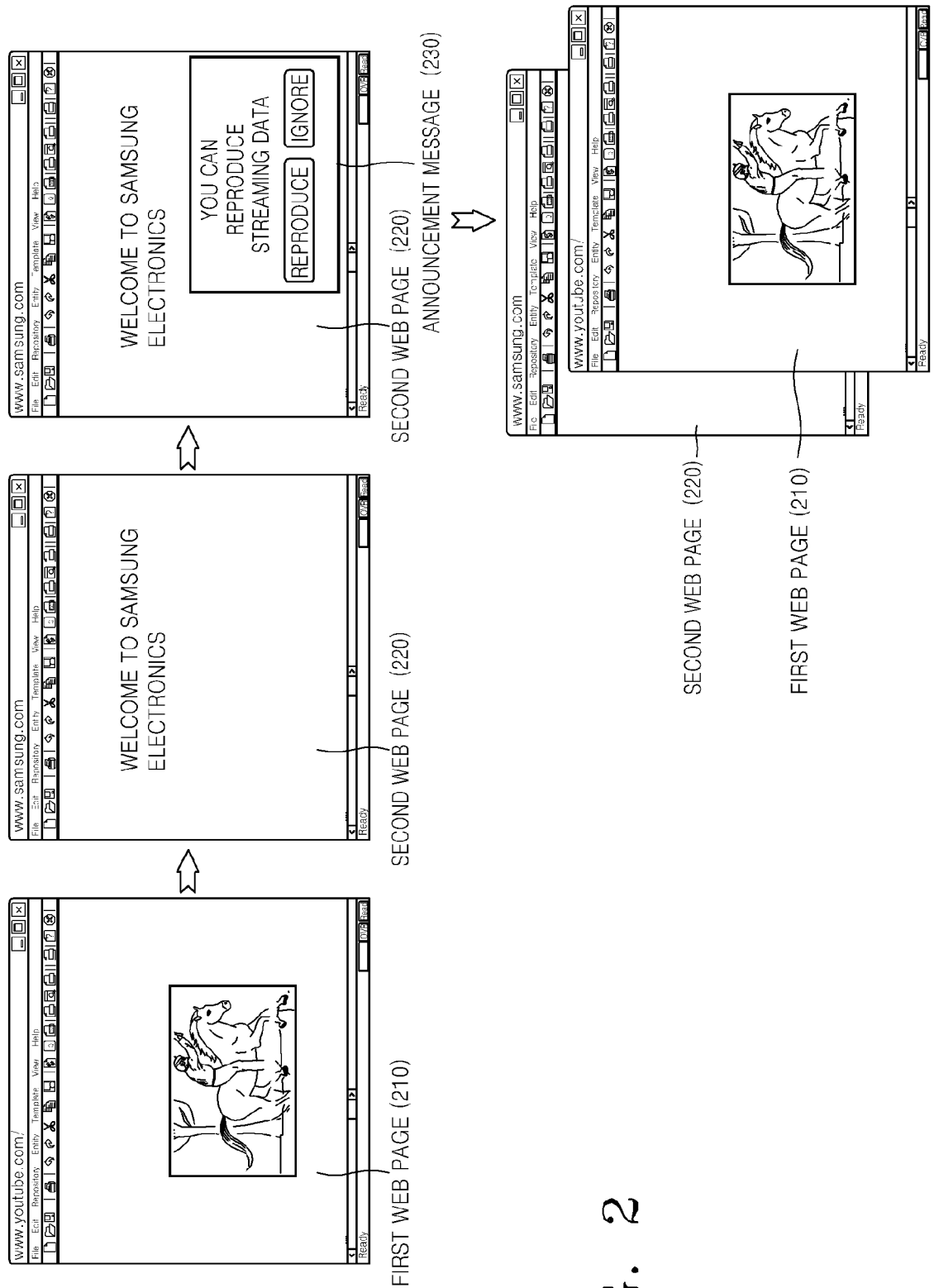
FIG. 2 is a diagram illustrating an operation of a data output device, according to an embodiment of the present invention.

FIG. 2 is a diagram illustrating an operation of a data output device, according to an embodiment of the present invention.

First, a user requests access to a web page such as, for example, youtube.com. Hereinafter, for convenience, youtube.com will be referred to as a first web page 210. The first web page 210 contains a moving picture. Additionally, it is assumed that the moving picture is streaming data that is transmitted by using a streaming method.

The first web page 210 is output on a display unit of the data output device, according to a user's request. However, since the streaming data is not smoothly received due to external factors, such as network latency, the moving picture is not continuously reproduced. Thus, the user requests switching from the first web page 210 to a second web page such as, for example, samsung.com. Hereinafter, for convenience of description, samsung.com will be referred to as a second web page 220.

When the request is received from the user to retrieve the second web page 220, it is determined whether the streaming data contained in the first web page 210 is completely reproduced. If the streaming data is not completely reproduced, the user is asked whether he/she wants to receive the stream data. It is assumed that the user requests output of the second web page while receiving the streaming data.

The second web page 220 is output on the display unit, and simultaneously the streaming data contained in the first web page 210 is continually received in the background.

When an appropriate amount of data to continuously reproduce the streaming data without data delay is received, the fact that streaming data is capable of being reproduced is announced. When the user wants to reproduce the streaming data, the controlling unit 130 forms a separate window, and outputs the first web page 210. In this case, the window containing the first web page 210, and the window containing the second web page 220 may be hierarchically positioned. When the user watches all the streaming data, the controlling unit 130 controls the data unit device in order to delete the window containing the first web page 310.

On the other hand, if a user does not want to reproduce the streaming data, the streaming data is deleted from the buffer.

Figure 3:
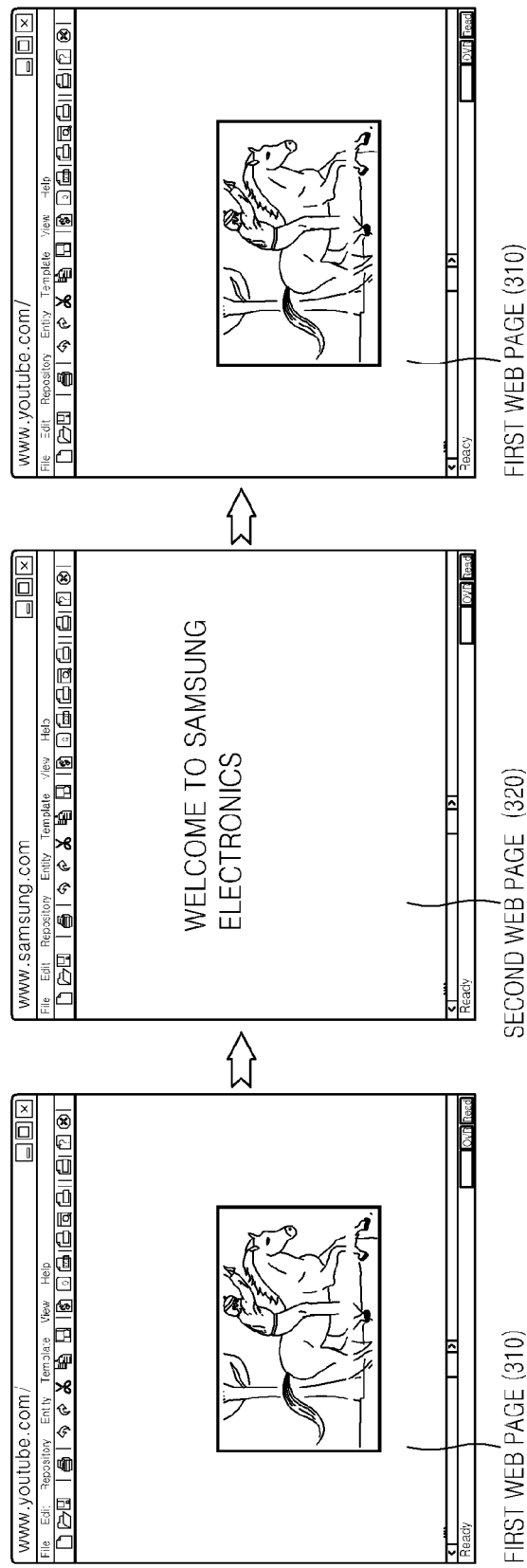
FIG. 3 is a diagram illustrating an operation of a data output device, according to another embodiment of the present invention.

FIG. 3 is a diagram illustrating an operation of a data output device, according to another embodiment of the present invention.

The operation of FIG. 3 is the same as the operation of FIG. 2 except for operations subsequent to the operation of announcing that the streaming data is capable of being reproduced.

While a second web page 320 is output to the data output device according to the present embodiment, if data of an amount that is appropriate to continuously reproduce the streaming data contained in a first web page 310 without data delay is received, the announcing unit 140 announces that the streaming data is capable of being reproduced. When the user requests reproduction of the streaming data, in response to the announcement the controlling unit 130 controls the data output device so that the first web page 310 may be output to a window in which the second web page 320 is output. When the user watches all the streaming data, the controlling unit 130 may control the data unit device so that the second web page 320 may be output to a window in which the first web page 310 is output.

Figure 4:
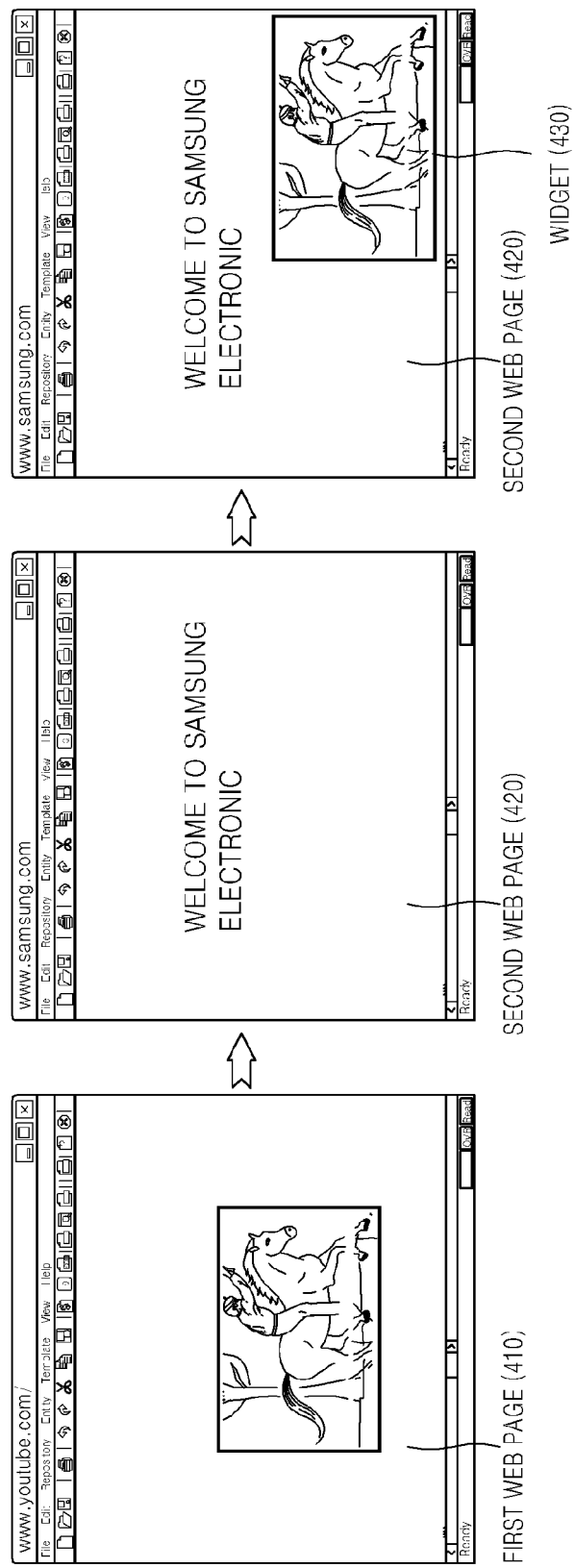
FIG. 4 is a diagram illustrating an operation of a data output device, according to another embodiment of the present invention.

FIG. 4 is a diagram illustrating an operation of a data output device, according to another embodiment of the present invention.

The operation of FIG. 4 is the same as the operation of FIG. 2 except for operations subsequent to the operation of announcing that the streaming data is capable of being reproduced.

While a second web page 420 is output to the data output device according to the present embodiment, if data of an amount that is appropriate to continuously reproduce the streaming data contained in a first web page 410 without data delay is received, the controlling unit 130 controls the data output device so that the streaming data may be output in a widget form. That is, the data output device may form a window for outputting the second web page 420 and a separate window 430, and may output only the streaming data.

When the user watches all the streaming data, the controlling unit 130 may control the data output device to delete a window in which the streaming data is output.

Figure 5:
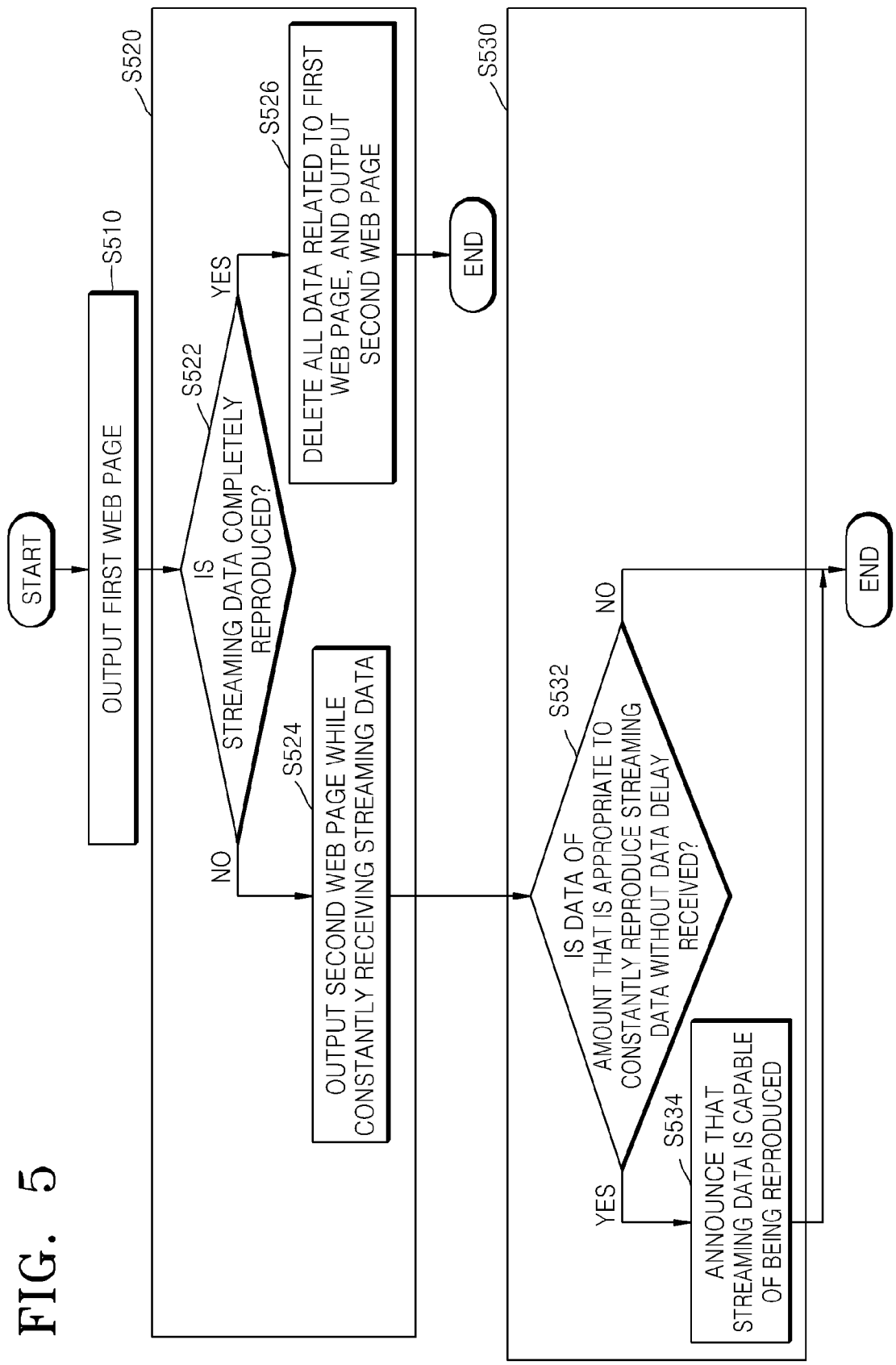
FIG. 5 is a flowchart of a method of outputting data, according to an embodiment of the present invention.

FIG. 5 is a flowchart of a method of outputting data, according to an embodiment of the present invention.

In step S510, a first web page containing streaming data is output.

In step S520, before the streaming data is completely reproduced, when a request for output of a second web page is received, the second web page is output while the streaming data is continuously received. Step S520 may include steps S522, S524, and S526.

In step S522, it is determined whether the streaming data is completely reproduced when the request for output of the second web page is received. When the streaming data is completely reproduced, step S526 is performed. When the streaming data is not completely reproduced, step S524 is performed.

In another embodiment of the present invention, even though the streaming data is not completely reproduced, if the streaming data was reproduced in step S510, step S526 may be performed, because we can assume that the user wants to change the first web page, even though the streaming data is reproduced seamlessly.

In step S524, while the streaming data is continuously received, a data output device is controlled so that the second web page may be output.

In step S526, all data related to the first web page is deleted from a buffer, and the data output device is controlled so that the second web page may be output.

In step S530, when data of an amount that is appropriate to continuously reproduce the streaming data is received, it is announced that the streaming data is capable of being reproduced. Step S530 may include steps S532 and S534.

In step S532, it is determined whether data of an amount that is appropriate to continuously reproduce the streaming data is received. When the data of an amount that is appropriate to continuously reproduce the streaming data is received, step S534 is performed.

In step S534, it is announced that the streaming data is capable of being reproduced.

Figure 6:
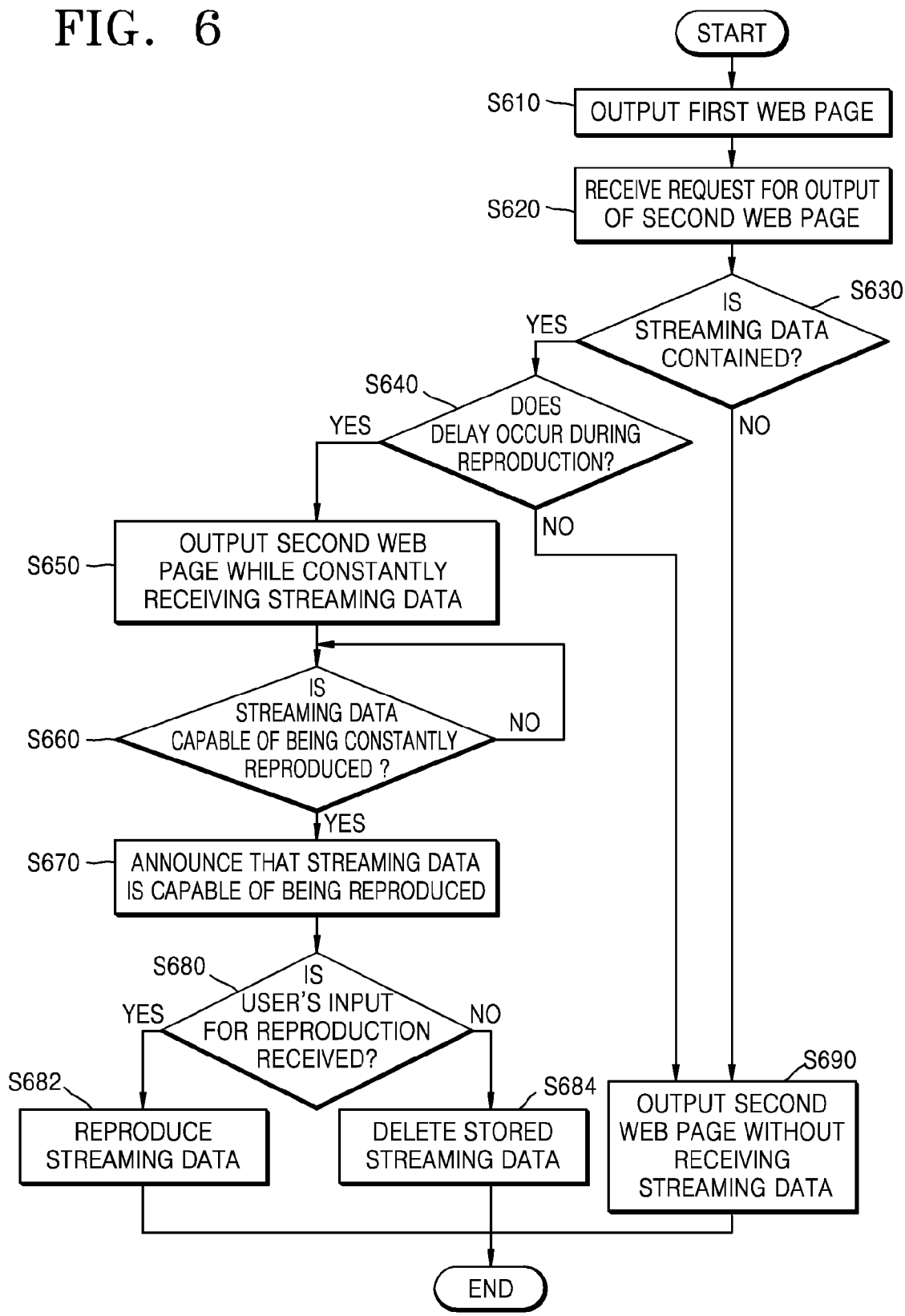
FIG. 6 is a flowchart of a method of outputting data, according to another embodiment of the present invention.

FIG. 6 is a flowchart of a method of outputting data, according to another embodiment of the present invention.

In step S610, a first web page is output.

In step S620, a request for output of a second web page is received.

In step S630, it is determined whether streaming data is contained in the first web page. If streaming data (e.g., a moving image) is contained in the first web page, step S640 is performed. If streaming data is not contained in the first web page, step S690 is performed.

In step S640, it is determined whether data delay occurs when the streaming data is reproduced, and it is determined whether the streaming data is completely received and reproduced when the request for output of a second web page is received. If the data delay does occur when the streaming data is reproduced, and the streaming data is not completely reproduced, step S650 is performed. If the streaming data is completely reproduced, step S690 is performed.

In step S650, while the streaming data is continuously received, the second web page is output.

In step S660, it is determined whether the streaming data is continuously reproduced. If the streaming data is capable of being continuously reproduced, step S670 is performed.

In step S670, it is announced that the streaming data is capable of being reproduced.

In step S680, it is determined whether a user's input requesting reproduction of the streaming data is received. If the user's input requesting reproduction of the streaming data is received, step S682 is performed. If a user's input is not received for a predetermined period of time, or a user's input requesting that the streaming data not be reproduced, step S684 is performed.

In step S682, the streaming data is reproduced by using the received data.

In step S684, the stored streaming data is deleted.

In step S690, the second web page is output without receiving the streaming data.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and storage media such as optical recording media (e.g., CD-ROMs, or DVDs).

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of outputting data, the method comprising:
   outputting a first web page containing streaming data to a window of a display unit;
   if reproducing the streaming data is delayed and incomplete, a user request to output a second web page is received, a user request to continue to receive the streaming data is received, outputting the second web page to the window on which the first web page is output and pausing the reproducing of the streaming data while continuously receiving the streaming data in a background; and
   when an amount of data that is appropriate to continuously reproduce the streaming data without data delay is received, while the second web page is being output, announcing that the streaming data is capable of being reproduced.

2. The method of claim 1, wherein outputting the second web page comprises determining whether data delay occurs when the streaming data is produced and outputting the second web page while continuously receiving the streaming data when the data delay occurs when the streaming data is reproduced.

3. The method of claim 1, wherein announcing, the streaming data comprises when the streaming data is not received for a predetermined period of time, announcing that the streaming data is not capable of being received.

4. The method of claim 1, further comprising when a request for reproduction of the streaming data is received in response to the announcing, outputting the first web page to a window in which the second web page is output.

5. The method of claim 1, further comprising when a request for reproduction of the streaming data is received in response to the announcing, outputting the streaming data to a separate window.

6. The method of claim 1, further comprising when a signal for refusing reproduction of the streaming data is received in response to the announcing, deleting the streaming data from a buffer.

7. A data output device comprising:
- an output unit for outputting a first web page containing streaming data;
- a receiving unit for receiving data related to the first web page;
- a controlling unit for controlling, if reproducing the streaming data is delayed, a user request to output a second web page is received, and a user request to continue to receive the streaming data is received, the data output device to output the second web page to the output unit that outputs the first web page and pause the reproducing of the streaming data while continuously receiving the streaming data in a background; and
- an announcing unit for announcing, if an amount of data that is appropriate to continuously reproduce the streaming data without data delay is received, while the second web page is being output, that the streaming data is capable of being reproduced.

8. The data output device of claim 7, wherein the controlling unit determines whether data delay occurs when the streaming data is reproduced and outputs the second web page while continuously receiving the streaming data when the data delay occurs when the streaming data is reproduced.

9. The data output device of claim 7, wherein, when the streaming data is not received for a predetermined period of time, the announcing unit announces that the streaming data is not capable of being received.

10. The data output device of claim 7, wherein, when a request for reproduction of the streaming data is received in response to the announcing, the controlling unit controls the data output unit to output the first web page to a window in which the second web page is output.

11. The data output device of claim 7, wherein, when a request for reproduction of the streaming data is received in response to the announcing, the controlling unit controls the data output unit to output the streaming data to a separate window.

12. The data output device of claim 7, wherein, when a signal for refusing reproduction of the streaming data is received in response to the announcing, the streaming data is deleted from a buffer.

13. A non-transitory computer readable recording medium having recorded thereon a program for executing a method of outputting data, the method comprising:
- outputting a first web page containing streaming data to a window of a display unit;
- if reproducing the streaming data is delayed and incomplete, a user request to output a second web page is received, and a user request to continue to receive the streaming data is received, outputting the second web page to the window on which the first web page is output and pausing the reproducing of the streaming data while continuously receiving the streaming data in a background; and
- when an amount of data that is appropriate to continuously reproduce the streaming data without data delay is received, while the second web page is being output, announcing that the streaming data is capable of being reproduced.

* * * * *